US009190198B2

(12) United States Patent
McBroom et al.

(10) Patent No.: US 9,190,198 B2
(45) Date of Patent: Nov. 17, 2015

(54) MAGNETIC FASTENERS

(71) Applicant: Apple Inc., Cupertino, CA (US)

(72) Inventors: Daniel L. McBroom, Leonard, TX (US); Michael D. McBroom, Leonard, TX (US)

(73) Assignee: Apple Inc., Cupertino, CA (US)

(*) Notice: Subject to any disclaimer, the term of this patent is extended or adjusted under 35 U.S.C. 154(b) by 233 days.

(21) Appl. No.: 13/973,957

(22) Filed: Aug. 22, 2013

(65) Prior Publication Data
US 2015/0055279 A1 Feb. 26, 2015

(51) Int. Cl.
H01F 7/02 (2006.01)
B25B 23/12 (2006.01)
H05K 5/02 (2006.01)
B23P 19/06 (2006.01)
B25B 13/48 (2006.01)
G06F 1/16 (2006.01)
E05B 47/00 (2006.01)
E05C 5/04 (2006.01)
F16B 1/00 (2006.01)

(52) U.S. Cl.
CPC ............ *H01F 7/0252* (2013.01); *B25B 13/481* (2013.01); *B25B 13/485* (2013.01); *B25B 23/12* (2013.01); *E05B 47/004* (2013.01); *E05B 47/0045* (2013.01); *E05C 5/04* (2013.01); *G06F 1/16* (2013.01); *B23P 19/06* (2013.01); *F16B 2001/0035* (2013.01)

(58) Field of Classification Search
CPC ....... G06F 1/1601; G06F 1/181; G06F 1/185; G06F 1/183; G06F 1/1656; F16M 2200/08; F16M 11/04; Y10T 29/49826; H05K 13/00; H05K 5/02; H05K 5/03; B25B 13/481; B25B 13/485; B25B 23/12; E05B 47/0038; F16B 2001/0035; G02F 2202/28; H01F 7/0252
USPC ........ 361/679.21, 679.07; 248/176.1; 29/428, 29/525.11, 744
See application file for complete search history.

(56) References Cited

U.S. PATENT DOCUMENTS

| 2,782,822 | A | * | 2/1957 | Clark | 81/451 |
| 5,794,497 | A | * | 8/1998 | Anderson | 81/451 |
| 2007/0007775 | A1 | * | 1/2007 | Gallas et al. | 292/251.5 |
| 2007/0234857 | A1 | * | 10/2007 | Kozak et al. | 81/451 |
| 2011/0080009 | A1 | * | 4/2011 | Redgrave | 292/251.5 |
| 2012/0131967 | A1 | * | 5/2012 | Sanchez Giraldez | 70/276 |
| 2013/0139657 | A1 | * | 6/2013 | Jenkins | 81/429 |

* cited by examiner

Primary Examiner — Hung S Bui
Assistant Examiner — Michael Matey
(74) Attorney, Agent, or Firm — Downey Brand LLP

(57) ABSTRACT

The described embodiments relate generally to magnetic fasteners. In particular a fastening apparatus for engaging and disengaging a fastener disposed within a device housing is described. By designing a fastener with a magnetically coded head that fastener can be both engaged and disengaged to a fastener attachment point within a device housing by a magnetic driver having a magnetically coded driving feature that corresponds to the magnetically coded fastener head. In this way a fastener can be attached at various orientations within a device housing after the device housing has been closed.

20 Claims, 9 Drawing Sheets

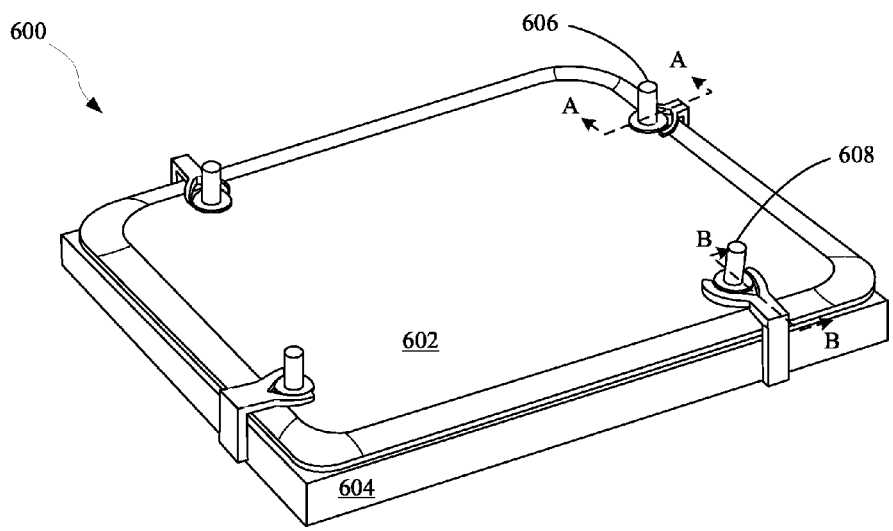
*FIG. 6A*
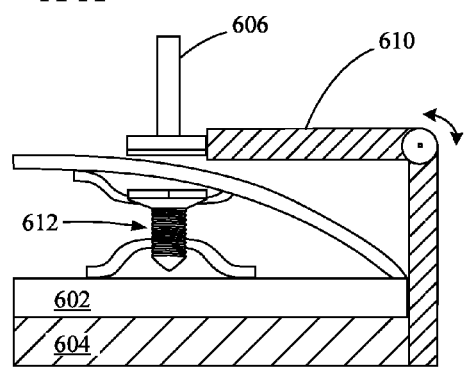
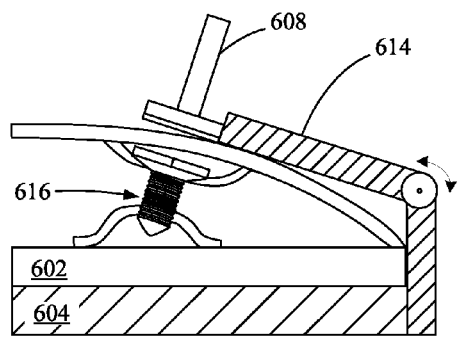
*FIG. 6B*  *FIG. 6C*

MAGNETIC FASTENERS

BACKGROUND

1. Technical Field

The described embodiments relate generally to magnetic fasteners. In particular a fastening apparatus for engaging and disengaging a fastener disposed within a device housing is described.

2. Related Art

Fasteners are used to join various components in a large variety of applications. Unfortunately, using fasteners to secure a part having an exterior, cosmetic surface generally results in a visible opening or at least a fastener head being visible after the product is fully assembled. Furthermore, in certain cases the visibility of an external fastener may also allow a user to more easily access components disposed within a device housing. In devices where tamper resistance is important, a readily visible fastener can be even more undesirable.

Therefore, what is desired is a reliable way to fasten components together in a way such that the fasteners are not readily visible to a user of the components.

SUMMARY

This paper describes various embodiments that relate to securing magnetic fasteners within a housing with a magnetic driver through an outer wall of the housing.

In a first embodiment an electronic device is disclosed. The electronic device includes at least the following components: a non-magnetic housing including a first component and a second component; a magnetic fastener disposed entirely within the electronic device housing and configured to secure the first and second components together, the magnetic fastener including both a threaded shaft engaged within an attachment point of the non-magnetic housing, and a magnetic head portion integrally formed with the threaded shaft and having a number of permanent magnets disposed radially with respect to the head portion, the permanent magnets forming a first magnetic polarity pattern. The magnetic fastener is operative to secure the first and second components together and is not accessible through an outside wall of the non-magnetic housing.

In another embodiment a contactless method for remotely securing a magnetic fastener enclosed within a non-magnetic device housing is disclosed. The method includes at least the following steps: aligning a rotational axis of a magnetic driver with a rotational axis of the magnetic fastener, a first surface of the magnetic driver being in direct contact with an exterior surface of the non-magnetic device housing; applying a first magnetic field at the exterior surface of the non-magnetic device housing with the magnetic driver, the first magnetic field having a first polarity pattern that forms a magnetic coupling with a corresponding second magnetic field emanating from the magnetic fastener; and rotating the magnetic driver such that the first magnetic field rotates, thereby applying a torque on the magnetic fastener by way of the magnetic coupling.

In yet another embodiment a fixturing device for positioning at least one magnetic driver with respect to an external surface of a non-magnetic electronic device housing is disclosed. The fixturing device includes at least the following components: a stage configured to secure the electronic device housing in a predetermined position during a fastening or unfastening operation; and a positioning arm configured to maneuver a magnetic driver in three dimensional space such that the magnetic driver is in substantially the same rotational axis as a magnetic fastener disposed entirely within the housing.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings in which:

FIGS. 6A-6D show various view of a fixturing device configured to orient magnetic drivers with respect to an electronic device housing.

DETAILED DESCRIPTION OF SELECTED EMBODIMENTS

Figure 1:
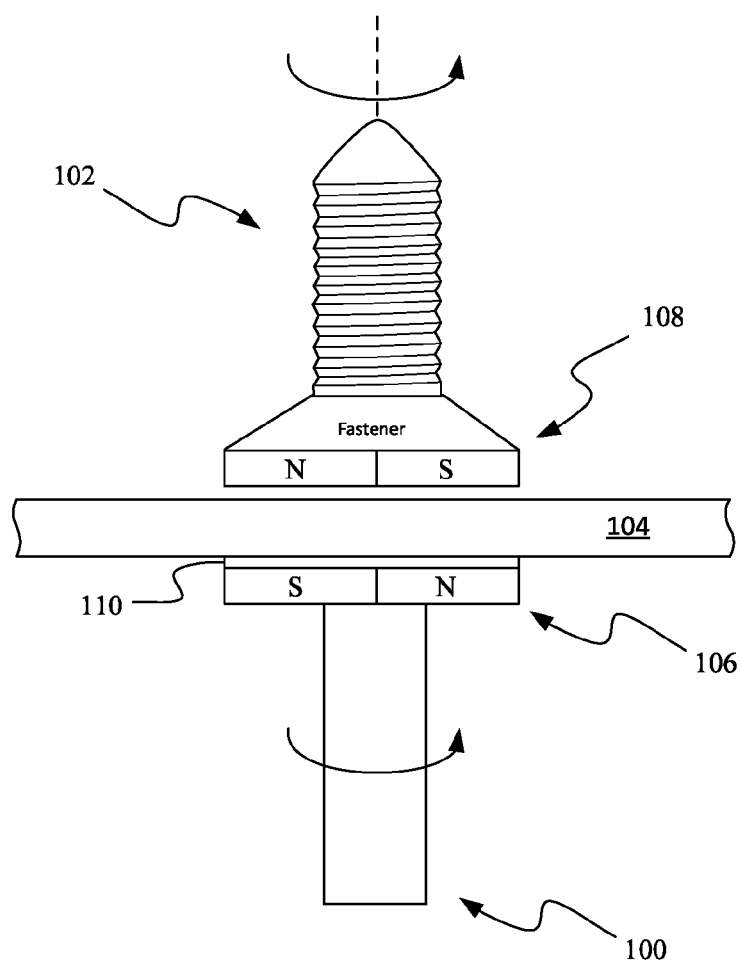
FIG. 1 shows a magnetic driver magnetically coupled to a magnetic fastener through an intervening substrate.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

By concealing a fastener within an enclosure or casing, new levels of tamper resistance can be achieved. Unfortunately, previous attempts at implementing hidden fasteners have been just as problematic for servicing centers to process as end users. For example, a fastener that engages with the closing of a housing and resists all external forces can cause a servicing center to break the fastener just to open the housing. By constructing a magnetic driver that magnetically couples with a fastener within the enclosure, service centers can open a secure enclosure with relative ease, while preventing user tampering that in many cases can cause damage to the device.

In one embodiment, a magnetic driver and corresponding fastener can have corresponding magnetic fields allowing a secure magnetic coupling to be established between the magnetic driver and fastener. The magnetic driver can be magnetically coupled to the magnetic fastener through an intervening wall of an enclosure. The magnetic coupling can be substantially unaffected by the intervening wall when the intervening wall is non-magnetic or magnetically neutral. The magnetic driver can be configured with a driving feature that emits a magnetic field having alternating polarities disposed radially with respect to an axis of rotation of the magnetic driver. Rotation of the magnetic driver causes the radially disposed polarities of the magnetic field to exert a moment on the magnetic fastener through the magnetic coupling. In some embodiments a magnetic field strength of the magnetic driver can be increased as an amount of torque needed to drive the fastener into an attachment point of the enclosure increases. Other factors influencing proper sizing of the magnetic field can include: susceptibility of proximate components to magnetic fields, and an increasing distance between the fastener and the magnetic driver.

In other embodiments, a fixturing device can be utilized to align the magnetic drivers with fasteners disposed within an enclosure. Such a fixturing device can be important when no reference surface on the enclosure is available. For example, in some embodiments proper positioning of a magnetic driver can be along a curved outside surface of the enclosure. Positioning a magnetic driver along a curved surface can be quite challenging even when a reference mark is provided to position the magnetic driver. Because proper alignment of the magnetic driver and magnetic fastener can be important to maximize a strength of a magnetic coupling, the fixturing device can be operative to provide precise control over alignment between a magnetic driver and fasteners disposed inside the enclosure. Furthermore, use of a fixturing device removes a need for a reference marking to be placed on the cosmetic surface for placement of a magnetic driver. In this way cosmetics of the enclosure can be maintained as no distracting markings need be used for marking a driver position. It should be noted that in some embodiments a position for a magnetic driver can be marked with an indicator that is not easily observed.

These and other embodiments are discussed below with reference to FIGS. 1-7; however, those skilled in the art will readily appreciate that the detailed description given herein with respect to these figures is for explanatory purposes only and should not be construed as limiting.

FIG. 1 shows a depiction of magnetic driver 100 acting on a magnetic fastener 102 through a magnetically neutral substrate 104. Magnetically neutral substrate 104 can be made of any of a number of magnetically neutral materials, such as aluminum. Instead of a tip for mechanically engaging fastener 102, magnetic driver 100 can have a magnetically coded driving feature 106 configured to interact with magnets disposed on magnetic fastener 102. Magnetically coded driving feature 106 can include a number of magnets to emit a magnetic field and a driving feature housing. The driving feature housing can be configured to provide spacing and protection for the magnets embedded within it. Magnets disposed within a head portion of the magnetic fastener can be permanent magnets made from highly magnetic materials such as rare earth magnets. In one particular embodiment neodymium magnets can be used. When magnetically coded driving feature 106 is rotated in proximity to fastener 102, fastener 102 can be rotated without any mechanical coupling between magnetic driver 100 and fastener 102. This can be accomplished, as depicted, by embedding magnets within head portion 108 of fastener 102. When the magnets within head portion 108 correspond to the magnets in magnetically coded driving feature 106 and magnetic driver 100 is aligned with fastener 102, magnetically coded driving feature 106 can be magnetically coupled with head portion 108 of fastener 102. Depending on a strength of the magnets utilized, varying amounts of torque can be applied through the magnetic coupling, thereby allowing a fastener to be embedded within another object without any mechanical contact between the magnetic driver and magnetic fastener. Magnetic driver 100 can be either manually driven or alternatively can be coupled to an electric drive system. In some embodiments an electric drive system can be preferable as it can be configured to turn at a speed that does not overcome an upper force limit of the magnetic coupling between magnetically coded driving feature 106 and head portion 108. In some embodiments magnetic driver 100 can include protective cover layer 110 to prevent scratching or marking of a cosmetic surface of magnetically neutral substrate 104.

Figure 2A:
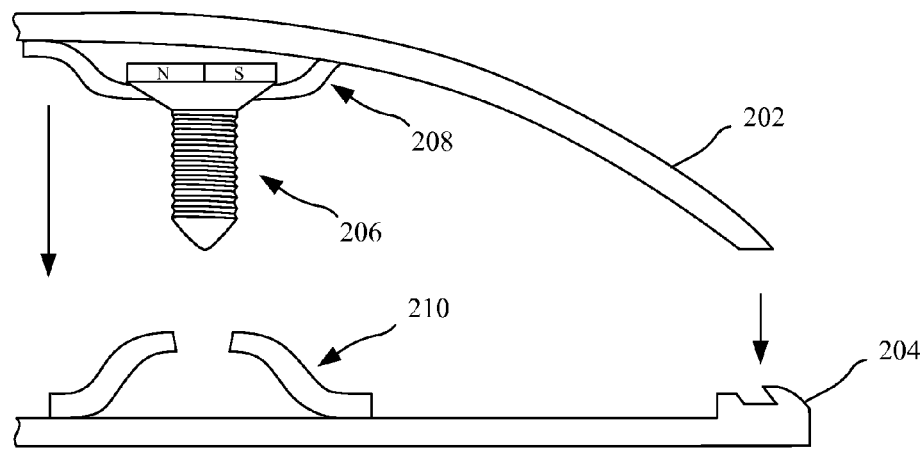
FIGS. 2A-2C show how a magnetic fastener can be used to fasten two components of a housing together.
Figure 2B:
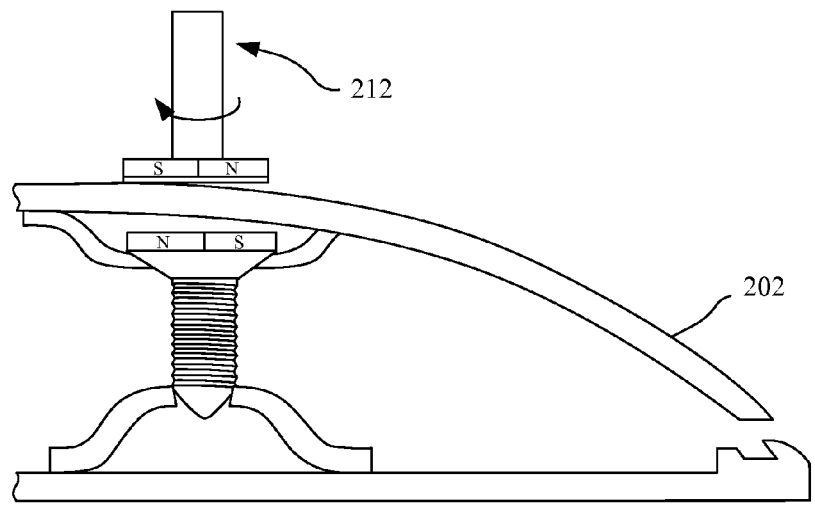
Figure 2C:
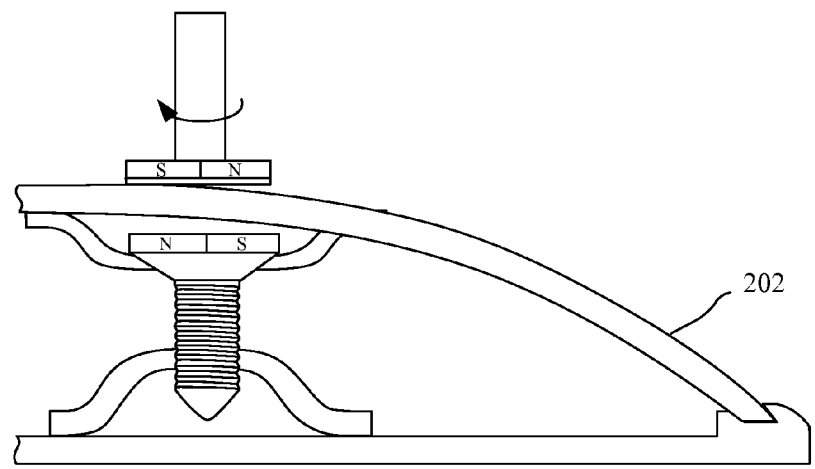

FIGS. 2A-2C show one embodiment in which a magnetic driver is used to secure a first component 202 to a second component 204 that form an enclosure when secured together. FIG. 2A shows a first step in which a fastener 206 is placed in a first bracket 208. First component 202 can then be lowered until fastener 206 is aligned and in contact with second bracket 210, as depicted in FIG. 2B. At this point magnetic driver 212 can be positioned along an exterior surface of first component 202 such that it is magnetically coupled with magnets of fastener 206. Such a positioning can be accomplished in a number of ways. In some embodiments magnetic driver 212 can be aligned via a marking or an exterior alignment feature on an exterior portion of first component 202. A rotational orientation of magnetic driver 212 can be established with a level included within magnetic driver 212 when fastener 206 is known to have a substantially vertical orientation. In other embodiments a fixturing device can be utilized to provide a proper orientation for magnetic driver 212 with respect to first housing component 202. An exemplary fixturing device is described in more detail below. FIG. 2C shows fastener 206 can be positioned after it is driven into second bracket 210 by magnetic driver 212.

Figure 3A:
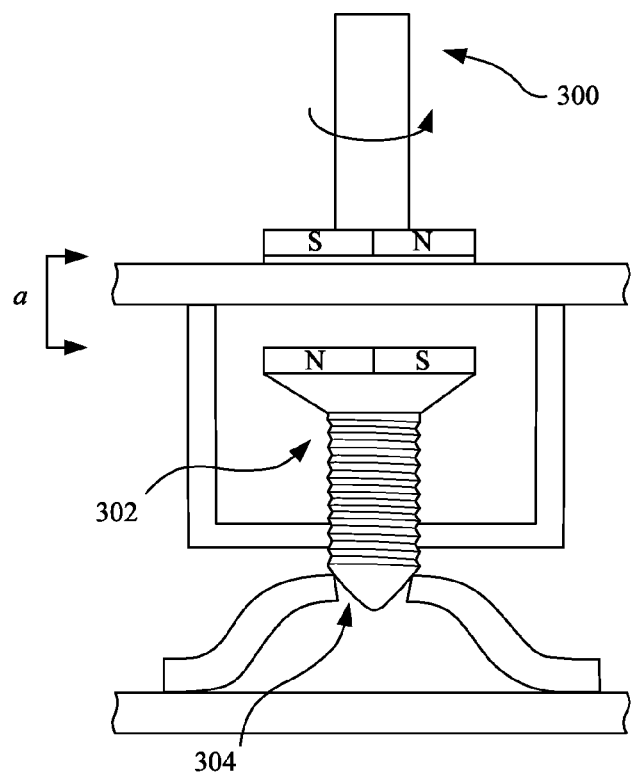
FIGS. 3A-3D show how a magnetic driver can be magnetically coupled to a fastener at varying distances between the fastener and the driver.
Figure 3B:
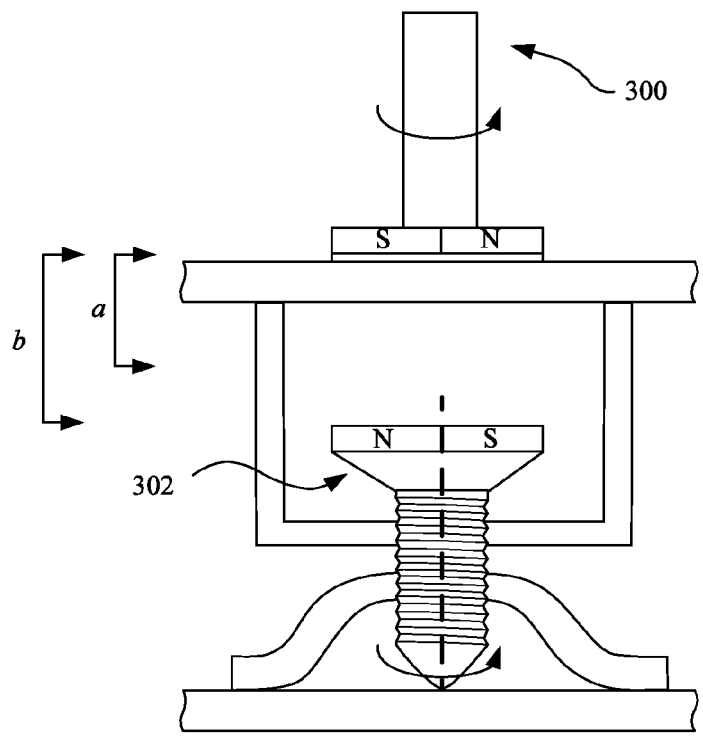

FIGS. 3A-3B shows another configuration compatible with the described embodiments. In this embodiment, magnetic driver 300 is configured to drive a fastener into threaded aperture 304. As depicted, a portion of fastener 302 that includes magnetic elements is moved progressively farther away from magnetic driver 300 as fastener 302 is lodged within threaded aperture 304. For example, in FIG. 3A a top surface of fastener 302 is displaced a distance a from a bottom surface of magnetic elements within magnetic driver 300. Once fastener 302 is driven within threaded aperture 304, a top surface of fastener 302 is substantially farther from magnetic driver 300, a distance b. In such a configuration, a magnetic coupling between magnetic driver 300 and fastener 302 should be substantially higher in FIG. 3B than in FIG. 3A. This weaker magnetic coupling problem is further exacerbated by an increased amount of force needed to tighten fastener 302 within threaded aperture 304. One way to overcome this problem is to provide a variable magnetic force to magnetic driver 300. Such a force can be provided by electromagnetic elements within magnetic driver 300. In this way, an appropriate force can be provided as fastener 302 is driven into place. In some embodiments, the magnetic elements within the magnetic driver and fastener can be configured to provide a powerful enough magnetic coupling between magnetic driver 300 and securing fastener 302 at both distances a and b. A variable strength magnetic field can be more desirable if in the position depicted in FIG. 3A magnetic driver 300 has a tendency to pull fastener 302 towards itself prior to beginning a fastening operation, and thereby unseating fastener 302. A variable strength magnetic field can also be desirable when for example, it is desirable to limit an amount of time nearby electronic components are exposed to the magnetic field emanating from the magnetic driver.

Figure 3C:
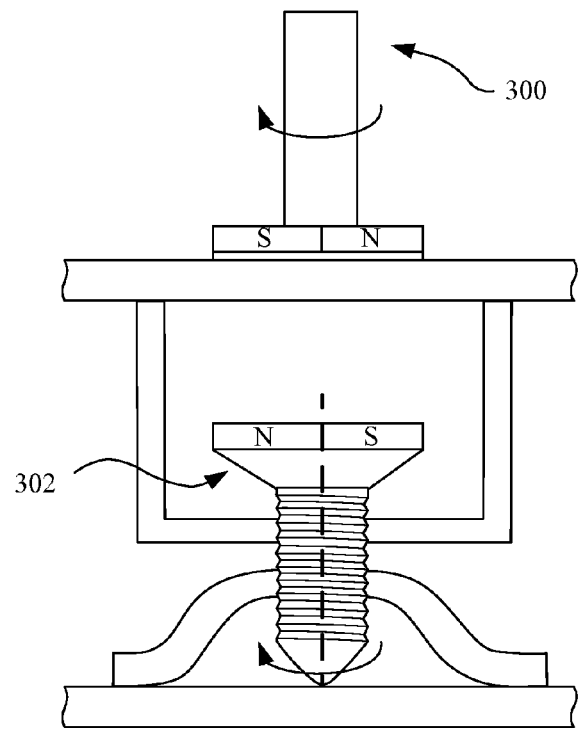
Figure 3D:
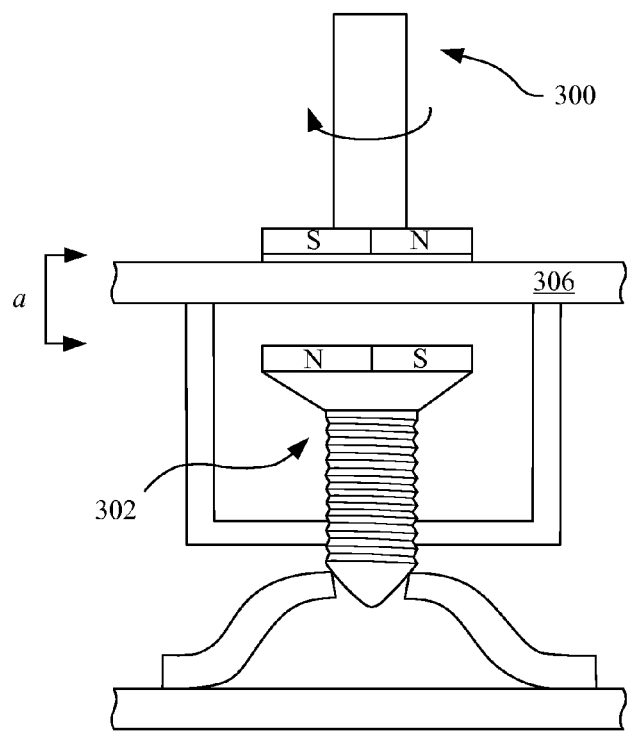

FIGS. 3C-3D depict how a fastener can be removed. In FIG. 3C magnetic driver 300 can be rotated in an opposite direction to remove fastener 302. It should be noted that a removal force can be greater than a force to secure the fastener. Consequently, a driver with a greater magnetic field can be required to remove a fastener due to a stiction force that needs to be overcome prior to initiating an unfastening operation on fastener 302. Finally, FIG. 3D shows fastener 302 in a removed position, thereby allowing the two components to be separated. In some embodiments, a top surface of fastener 302 can be brought into contact with an inside surface of substrate 306 as a result of the magnetic coupling.

Figure 4A:
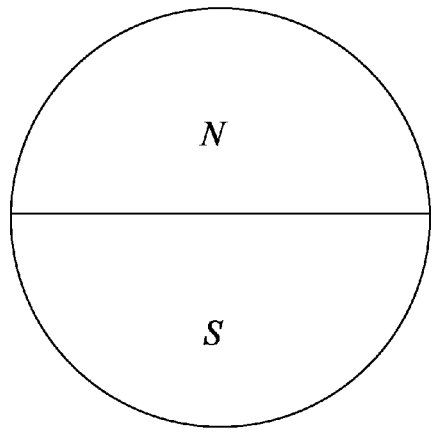
FIGS. 4A-4D show varying magnetic configurations that can be applied to a magnetic driver or magnetic fastener.
Figure 4B:
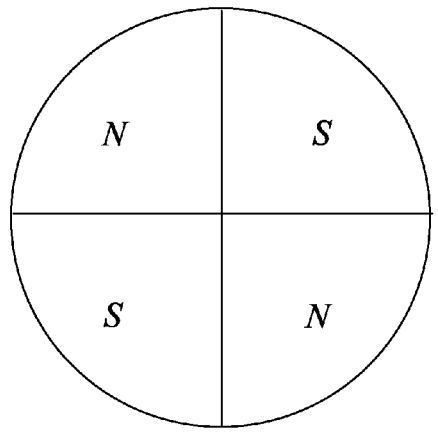

FIGS. 4A-4D show various magnetic code configurations that can be applied to a magnetic driver or alternatively to a head portion of a fastener. Compatible magnetic drivers and head portions would include corresponding magnetic code configurations. FIG. 4A shows a simple pattern in which only two poles are arranged together. It should be noted that while the depicted embodiment is circular in geometry, any number of geometries can be utilized as long as polarities vary radially and correspond between the magnetic driver and head portion. For example, a square shaped or even asymmetrically shaped driving feature can be utilized. In some embodiments, the driver can have a different shape than a fastener head as long as the magnetic fields are complementary and form a secure magnetic coupling when in close proximity. FIG. 4B shows alternating quadrants having alternating polarities. When FIGS. 4A and 4B represent the magnetic driver, a head portion of a fastener would be substantially the same as the depictions in FIGS. 4A and 4B. The fastener would tend to be magnetically coupled with the magnetic driver when it is in an orientation such that opposing polls line up with one another.

Figure 4C:
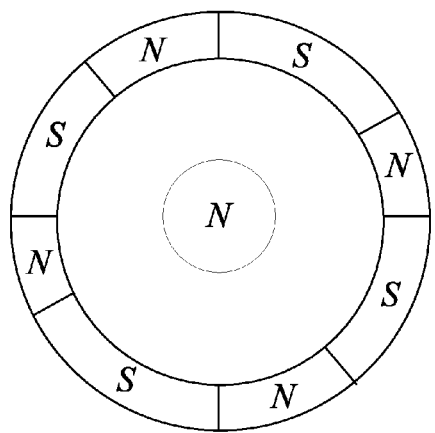
Figure 4D:
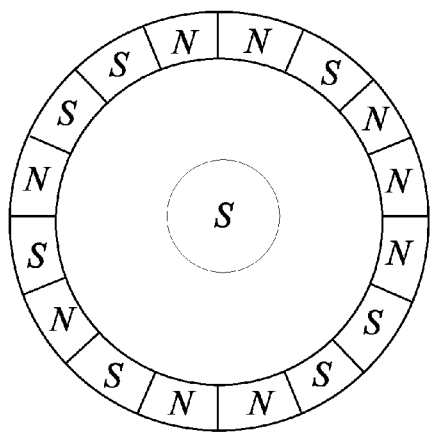

FIG. 4C shows a configuration in which alternating polarity magnetic elements are disposed about a periphery of the magnetic driver and/or head portion of the fastener. It should be noted that the depicted magnetic elements have different sizes. In such a configuration, the other object to be magnetically coupled would have a configuration with similarly sized but oppositely polarized magnets. Also depicted is a magnetic element disposed in a central portion of the magnetic driver or fastener. This central magnetic element can provide a repulsive force between the magnetic driver and fastener. For example, a North polarity magnet can be disposed within both the magnetic driver and the fastener thereby causing an amount of repulsion to be experienced between the magnetic elements. When the repulsive field is narrowly shaped and acts substantially along an axis shared by both the magnetic driver and the fastener, then the peripherally disposed magnetic elements can be magnetically coupled for rotational driving while the central element contributes a downward force on a fastener, that can be useful while driving a fastener into a coupling position. FIG. 4D shows yet another embodiment that can be used for a magnetic driver or a fastener. In this depicted embodiment, the magnetic coding is not just alternating N, S, but is somewhat randomized. By randomizing the order and even size of the magnetic elements, a highly individual pattern can be created. In some instances, a device can have screws that each require a driver having a different magnetic polarity pattern. This can be advantageous when for example, a device maker wants to substantially increase a difficulty associated with opening the device housing.

Figure 5:
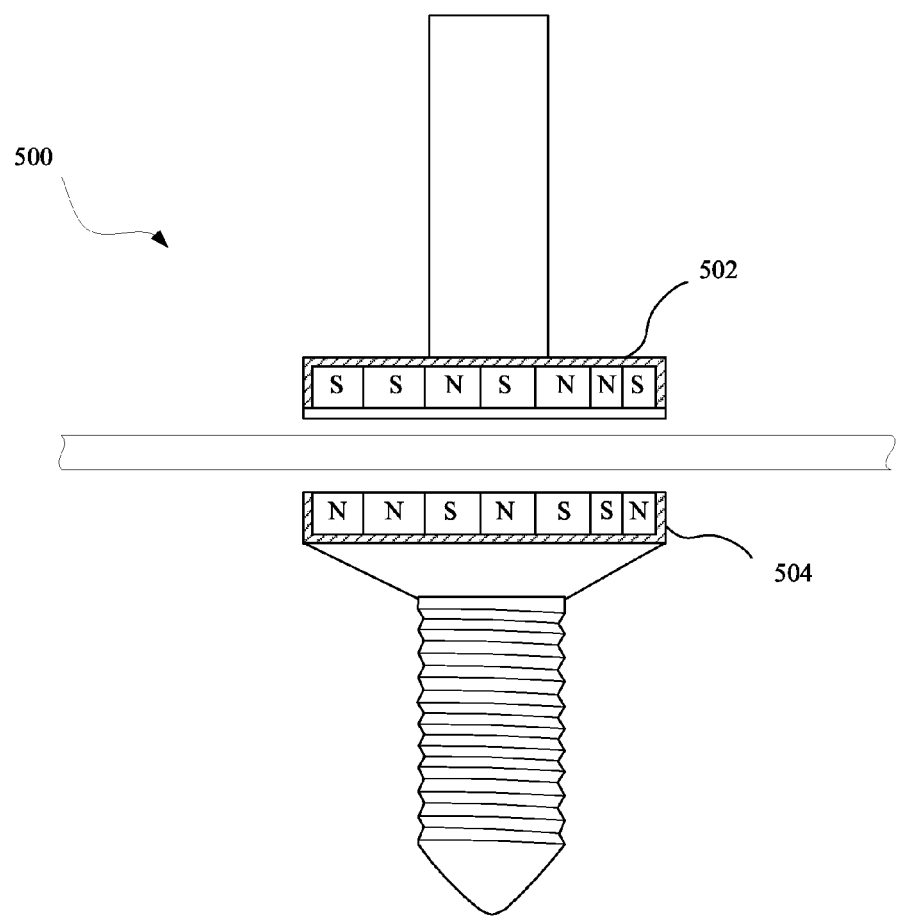
FIG. 5 shows a shunted magnetic driver and a shunted magnetic fastener.

FIG. 5 shows a cross-sectional side view of a magnetic driver 500 that includes a shunt 502 for directing magnetic field emanating from magnetic driver. Magnetic shunt 502 can be operative to direct a magnetic field emanating from magnetic driver 500. By directing or shaping the magnetic field, the magnetic field can be prevented from interfering with or damaging other electronics disposed within the enclosure. Magnetic shunt 502 can also increase a magnetic field strength of the magnetic field leaving magnetic driver 500. In embodiments where permanent magnets are utilized a magnetic shunt can provide additional field strength needed to overcome a stiction force associated with removing a fastener. The permanent magnets utilized can be rare earth magnets made from materials such as neodymium. In some embodiments, the magnetic fastener can also include shunt 504 that orients a magnetic field towards the magnetic driver. By directing the orientation of the magnetic field associated with the fastener the magnetic coupling between the magnetic driver and magnetic fastener can be further strengthened.

FIG. 6A shows a perspective view of fixturing device 600 configured to orient a number of magnetic drivers with respect to an electronic device 602. While a specific embodiment is depicted it should be understood that any fixturing device having means for positioning magnetic drivers with respect to an electronic device can be utilized. In the depicted embodiment an electronic device 602 can be mounted on stage 604. Stage 604 can be operative to position electronic device 602 in a specific position with respect to a number of orientation arms. The orientation arms can be utilized to position magnetic drivers with respect to the electronic device. In some embodiments magnetic driver 606 can be oriented in a different plane than magnetic driver 608.

Figure 6D:
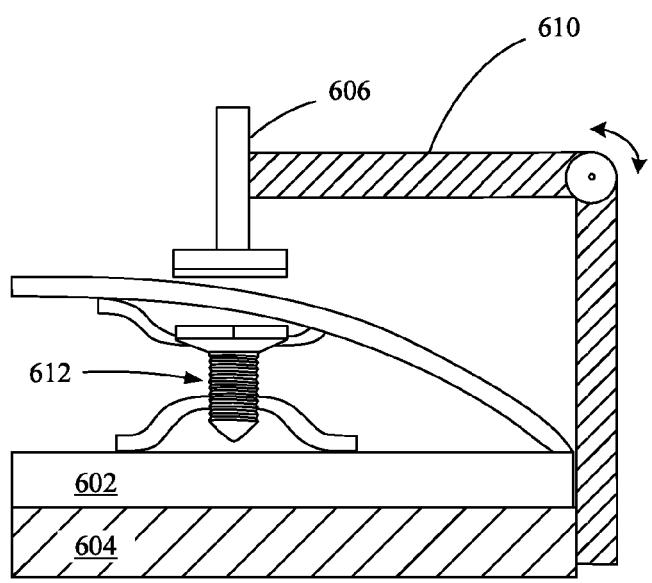

In FIG. 6B orientation arm 610 can be utilized to align magnetic driver 606 vertically and in line with fastener 612. Orientation arm 610 substantially overcomes problems associated with orienting magnetic driver 606 above an outer curved surface of electronic device 602 by providing a steady support upon which magnetic driver can rest. FIG. 6C shows how orientation arm 614 can be used to orient magnetic driver 608 with respect to another curved surface of first housing component 202. In this embodiment fastener 616 has both vertical and horizontal components with respect to electronic device 602. In this way, a secured fastener 616 can be configured to resist both vertical and shearing forces applied to electronic device 602. Furthermore, since there is no external surface defining a plane in which magnetic driver 608 is placed during a fastening or unfastening operation, a difficulty level associated with removing magnetic fastener 616 from electronic device 602 can be substantially increased. Removal of magnetic fastener can require both magnetic driver 608 and fixturing device 600 as proper orientation of magnetic driver would be quite difficult without fixturing device 600. Fixturing device 600 also allows for electronic device 602 to be designed in a way such that no indicators need be designated on an exterior cosmetic surface of electronic device 602 to designate a position of the magnetic fasteners since fixturing device 600 can be preconfigured to properly position magnetic drivers for a given electronic device 602, based only upon exterior dimensions of electronic device 602. FIG. 6D shows an alternate embodiment in which orientation arm 610 is coupled to a shaft portion of magnetic driver 606. In such a configuration orientation arm 610 can be configured to rotationally drive magnetic driver 606 through the shaft portion of magnetic driver 606.

Figure 7:
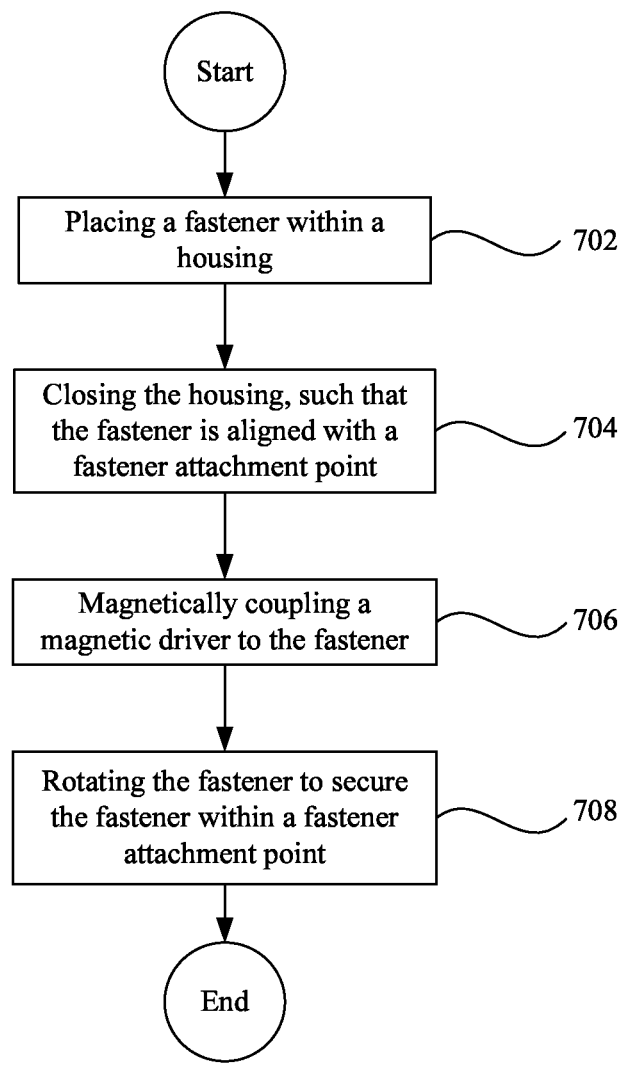
FIG. 7 shows a block diagram describing a method for securing two components with a magnetic fastener.

FIG. 7 shows a block diagram representing a method for installing a magnetic fastener. In a first step 702 at least one magnetic fastener is placed within a device housing. The fastener can be placed within a bracket that assists in positioning the fastener within the housing. At step 704, the fastener can be enclosed within the housing, in an unfastened state. At step 706, a magnetic driver can be positioned along an outside surface of the device housing such that it is aligned along the same axis as the enclosed fastener. This alignment can be facilitated by the use of a fixturing device that is preconfigured to position the magnetic driver with respect to the device housing. In such a position the magnetic driver is configured to become magnetically coupled with the magnetic fastener. In embodiments where magnets associated with the magnetic driver are electromagnets, the electromagnets can be energized to achieve the magnetic coupling. Once the magnetic driver and fastener are magnetically coupled the magnetic driver can be rotated, which in turn exerts torque on the fastener through the magnetic coupling, thereby causing the magnetic fastener to rotate. The rotational movement is achieved by a complementary magnet coding disposed about a periphery of both the magnetic driver and the magnetic fastener. At step 708 the magnetic driver rotates the fastener until the fastener is secured to an attachment point within the housing.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An electronic device, comprising: a non-magnetic housing comprising a first component and a second component; a magnetic fastener disposed entirely within the electronic device housing and configured to secure the first and second components together, the magnetic fastener comprising: a threaded shaft engaged within an attachment point of the non-magnetic housing, and a magnetic head portion integrally formed with the threaded shaft and having a plurality of permanent magnets disposed radially with respect to the head portion, the plurality of permanent magnets forming a first magnetic polarity pattern, wherein the magnetic fastener is operative to secure the first and second components together and is not accessible through an outside wall of the non-magnetic housing.

2. The electronic device as recited in claim 1, wherein the non-magnetic housing is configured to be opened by magnetically coupling a magnetic driver to the magnetic head portion of the magnetic fastener and rotating the magnetic driver such that a torque transmitted through the magnetic coupling removes the fastener out of the attachment point.

3. The electronic device as recited in claim 2, wherein the magnetic driver comprises: a plurality of magnets arranged to emit a second magnetic polarity pattern corresponding to the first magnetic polarity pattern; and a protective layer disposed on a first surface of the plurality of magnets the protective layer configured to prevent the first surface of the plurality of magnets from marring a cosmetic surface of the housing during a fastening or unfastening operation.

4. The electronic device as recited in claim 2, wherein one of the plurality of magnets of the magnetic head portion is disposed in a central portion of the magnetic head portion such that it can interact with a centrally disposed magnet within the magnetic driver such that the magnetic fastener receives a force oriented along the rotational axis of the fastener in addition to the torque transmitted through the magnetic coupling.

5. The electronic device as recited in claim 1, wherein the attachment point is disposed on an inside surface of the first component and the magnetic head portion of the magnetic fastener is engaged with a bracket disposed on an inside surface of the second component.

6. The electronic device as recited in claim 1, wherein a rotational axis of the magnetic fastener extends through a curved surface of the non-magnetic housing.

7. The electronic device as recited in claim 1, wherein the plurality of magnets of the magnetic fastener are shunted so that the first magnetic polarity pattern extends substantially along the rotational axis of the magnetic fastener.

8. The electronic device as recited in claim 2, wherein the magnetic driver is aligned with a rotational axis of the magnetic fastener using a fixturing device configured to orient the magnetic fastener with respect to the non-magnetic device housing.

9. The electronic device as recited in claim 8, wherein the fixturing device comprises a plurality of orientation arms configured to orient a number of magnetic drivers with respect to the non-magnetic device housing.

10. A contactless method for remotely securing a magnetic fastener enclosed within a non-magnetic device housing, the method comprising:
aligning a rotational axis of a magnetic driver with a rotational axis of the magnetic fastener, a first surface of the magnetic driver being in direct contact with an exterior surface of the non-magnetic device housing;
applying a first magnetic field at the exterior surface of the non-magnetic device housing with the magnetic driver, the first magnetic field having a first polarity pattern that forms a magnetic coupling with a corresponding second magnetic field emanating from the magnetic fastener; and
rotating the magnetic driver such that the first magnetic field rotates, thereby applying a torque on the magnetic fastener by way of the magnetic coupling.

11. The method as recited in claim 10, wherein rotating the magnetic driver comprises rotating the magnetic driver at a speed commensurate with a strength of the magnetic coupling until the fastener is engaged with an attachment point within the device housing, the fastener operative to secure at least two components of the device housing together.

12. The method as recited in claim 10, wherein rotating the magnetic driver comprises rotating the magnetic driver at varying rotational speeds, the rotational speed at any given time corresponding to an amount of torque the fastener can receive given a strength of the magnetic coupling.

13. The method as recited in claim 10, wherein aligning the rotational axes of the magnetic driver and the fastener comprises aligning the axes using a fixturing device, preconfigured to set an orientation between the magnetic driver and the non-magnetic device housing.

14. The method as recited in claim 10, further comprising: increasing a strength of a magnetic field emitted from the magnetic driver as a magnetic head portion of the magnetic fastener moves farther away from the magnetic driver.

15. The method as recited in claim 10, wherein a resulting shape of the magnetic coupling between the magnetic driver and magnetic fastener is configured to avoid magnetically sensitive components disposed within the device housing.

16. A fixturing device for positioning at least one magnetic driver with respect to an external surface of a non-magnetic electronic device housing, the fixturing device comprising:
a stage configured to secure the electronic device housing in a predetermined position during a fastening or unfastening operation; and
a positioning arm configured to maneuver a magnetic driver in three dimensional space such that the magnetic driver is in substantially the same rotational axis as a magnetic fastener disposed entirely within the housing.

17. The fixturing device as recited in claim 16, wherein the positioning arm is configured to exert a moment on the magnetic driver during a fastening operation.

18. The fixturing device as recited in claim 16, wherein the positioning arm includes a plurality of predetermined positions that correspond to various fastener positions within the housing.

19. The fixturing device as recited in claim 16, further comprising a plurality of positioning arms, each of the plurality of positioning arms configured to position a magnetic fastener with respect to a magnetic fastener disposed within the housing.

20. The fixturing device as recited in claim 19, wherein each of the plurality of positioning arms are configured to orient the plurality of magnetic drivers with a corresponding magnetic fastener disposed within the non-magnetic electronic device housing.

* * * * *